(12) United States Patent
Burton et al.

(10) Patent No.: US 7,404,005 B1
(45) Date of Patent: Jul. 22, 2008

(54) METHOD, SYSTEM, AND PROGRAM FOR SELECTING ONE OF MULTIPLE PATHS TO COMMUNICATE WITH A DEVICE

(75) Inventors: David Alan Burton, Vail, AZ (US); Robert Louis Morton, Tucson, AZ (US); Erez Webman, Petach-Tikva (IL)

(73) Assignee: International Business Machines Corporation, Armonk, NY (US)

( * ) Notice: Subject to any disclaimer, the term of this patent is extended or adjusted under 35 U.S.C. 154(b) by 660 days.

(21) Appl. No.: 09/591,024

(22) Filed: Jun. 9, 2000

(51) Int. Cl.
*G06F 15/173* (2006.01)
(52) U.S. Cl. ............... 709/238; 709/224; 709/239
(58) Field of Classification Search ............... 709/238, 709/239, 224, 213, 214; 710/31
See application file for complete search history.

(56) References Cited

U.S. PATENT DOCUMENTS

| | | |
|---|---|---|
| 5,537,533 A | 7/1996 | Staheli et al. |
| 5,544,347 A | 8/1996 | Yanai et al. |
| 5,574,950 A | 11/1996 | Hathorn et al. |
| 5,627,961 A | 5/1997 | Sharman |
| 5,649,196 A | 7/1997 | Woodhill et al. |
| 5,680,580 A | 10/1997 | Beardsley et al. |
| 5,682,513 A | 10/1997 | Candelaria et al. |
| 5,815,649 A | 9/1998 | Utter et al. |
| 5,832,222 A | 11/1998 | Dziadosz et al. |
| 5,845,328 A | 12/1998 | Maya et al. |
| 5,870,537 A | 2/1999 | Kern et al. |
| 5,889,935 A | 3/1999 | Ofek et al. |
| 5,901,327 A | 5/1999 | Ofek |
| 5,920,695 A | 7/1999 | Hathorn et al. |
| 5,933,653 A | 8/1999 | Ofek |
| 5,960,216 A | 9/1999 | Vishlitzky et al. |
| 6,167,438 A * | 12/2000 | Yates et al. ............... 709/216 |
| 6,301,267 B1 * | 10/2001 | Ben-Ami ............... 370/368 |
| 6,542,468 B1 * | 4/2003 | Hatakeyama ............... 370/238 |
| 6,944,684 B1 * | 9/2005 | Kinjo et al. ............... 710/31 |
| 2002/0165957 A1 * | 11/2002 | Devoe et al. ............... 709/224 |
| 2003/0016624 A1 * | 1/2003 | Bare ............... 370/217 |

FOREIGN PATENT DOCUMENTS

JP 10031561 3/1998

OTHER PUBLICATIONS

U.S. Appl. No. 09/111,626, filed Jul. 7, 1998.
U.S. Appl. No. 09/234,806, filed Jan. 19, 1999.
U.S. Appl. No. 09/591,016, filed Jun. 9, 2000.
U.S. Appl. No. 09/591,023, filed Jun. 9, 2000.

(Continued)

*Primary Examiner*—Jason Cardone
*Assistant Examiner*—Adnan M Mirza
(74) *Attorney, Agent, or Firm*—David W. Victor; Konrad Raynes & Victor LLP

(57) ABSTRACT

Disclosed is a method, system, program, and data structure for selecting one of multiple data paths to a device. A selection is made of one of multiple paths indicated as enabled to transmit data. A path is indicated as enabled or disabled. Transfer time data is gathered for each enabled path capable of being selected. Paths having transfer time data satisfying a threshold are indicated as disabled. Paths indicated as disabled are not capable of being selected to use to transmit data.

13 Claims, 5 Drawing Sheets

OTHER PUBLICATIONS

"Method for Improving the Host I/O Performance during Concurrent Copy", IBM Technical Disclosure Bulletin, vol. 37, No. 02A, Feb. 1994, pp. 481-482.

"Remote Copy Link-Level Reconfiguration without Affecting Copy Pairs", IBM Technical Disclosure Bulletin, vol. 38, No. 1, Jan. 1995, pp. 305-306.

"Management of Peer-to-Peer Control Unit Paths", IBM Technical Disclosure Bulletin, vol. 38, No. 9, Sep. 1995, pp. 95-98.

"Performance Improvement through the use of Multi-Channel Command Word", IBM Technical Disclosure Bulletin, vol. 38, No. 9, Sep. 1995, pp. 155-156.

"Bad Response to Establish Pathing Control Frame in Peer-to-Peer Remote Copy Function", IBM Technical Disclosure Bulletin, vol. 38, No. 12, Dec. 1995, pp. 515-517.

"Efficient Management of Remote Disk Subsystem Data Duplexing", IBM Technical Disclosure Bulletin, vol. 39, No. 1, Jan. 1996, pp. 49-51.

"Fixed Storage Allocation of Input-Output Buffers", IBM Technical Disclosure Bulletin, vol. 39, No. 3, Mar. 1996, pp. 75-76.

"Integration of Persistent Memory Data Info Real-Time Asynchronous Direct Access Storage Device Remote Copy", IBM Technical Disclosure Bulletin, vol. 39, No. 10, Oct. 1996, pp. 187-189.

"Single Subsystem PPRC Copy", IBM Research Disclosure, Feb. 1999, p. 264.

* cited by examiner

| Path | Less than 9 Blocks | 9-64 Blocks | More than 64 Blocks |
|---|---|---|---|
| 1 | | | |
| 2 | | | |
| 3 | | | |
| ... | | | |
| ... | | | |
| 16 | | | |

FIG. 2A

| Block Size Range | Number of Transfers |
|---|---|
| Less than 9 | 32 |
| Between 9 and 64 | 110 |
| Greater than 64 | 8 |

FIG. 2B

METHOD, SYSTEM, AND PROGRAM FOR SELECTING ONE OF MULTIPLE PATHS TO COMMUNICATE WITH A DEVICE

CROSS-REFERENCE TO RELATED APPLICATIONS

This application is related to the following co-pending and commonly-assigned patent applications, all of which are filed on the same date herewith, and all of which are incorporated herein by reference in their entirety:

"Method, System, And Program For Determining A Number of Write Operations to Execute", to David A. Burton, Robert L. Morton, and Erez Webman, having U.S. application Ser. No. 09/591,023, and "Method, System, And Progran For Remote Copy in an Open Systems Environment" to David A. Burton, Robert L. Morton, and Erez Webman, having U.S. application Ser. No. 09/591,016.

BACKGROUND OF THE INVENTION

1. Field of the Invention

The present invention relates to a system, method, and program for selecting a path to use to communicate to a device to improve transmission performance.

2. Description of the Related Art

Two systems communicating over a network may each include multiple ports, thus providing multiple paths across which data can be communicated. In certain prior art systems, a path may be selected according to a round robin or other predefined path rotation technique or a single default path is used for all operations. However, such techniques do not attempt to optimize path selection when there are multiple available paths.

For this reason, there is a need in the art to provide a methodology for selecting paths that improves data transfer rates across the system when there are multiple paths between the two systems.

SUMMARY OF THE PREFERRED EMBODIMENTS

To overcome the limitations in the prior art described above, preferred embodiments disclose a method, system, and program for selecting one of multiple data paths to a device. A selection is made of one of multiple paths indicated as enabled to transmit data. A path is indicated as enabled or disabled. Transfer time data is gathered for each enabled path capable of being selected. Paths having transfer time data satisfying a threshold are indicated as disabled. Paths indicated as disabled are not capable of being selected to use to transmit data.

In further embodiments, one disabled path is indicated as enabled after performing a threshold number of transfer operations.

Still further, transfer time data may be gathered by path and transfer size. In such case, a path is disabled for a given transfer size. A path disabled for one transfer size is capable of being enabled for at least one other transfer size.

In still further embodiments, gathering transfer time data further involves, for each enabled path, gathering a cumulative transfer time for all transfer operations during a measurement period through the path and gathering a cumulative number of the transfer operations during the measurement period. For each enabled path a determination is made of an average cumulative transfer time for the measurement period by dividing the cumulative time by the cumulative number of transfers for the path, wherein the path is indicated as disabled if the average cumulative transfer time for the path satisfies the threshold.

Preferred embodiments provide a method, system, and program for gathering performance data with respect to different paths used to transmit data to a remote device. This performance data is then used to determine whether any paths should be indicated as disabled and removed from the potential selection pool due to relatively poor performance for the path. In this way, preferred embodiments provide an algorithm for optimizing path performance.

BRIEF DESCRIPTION OF THE DRAWINGS

Referring now to the drawings in which like reference numbers represent corresponding parts throughout:

FIGS. 2a, b illustrate an example of data structures used in accordance with the preferred embodiments of the present invention.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
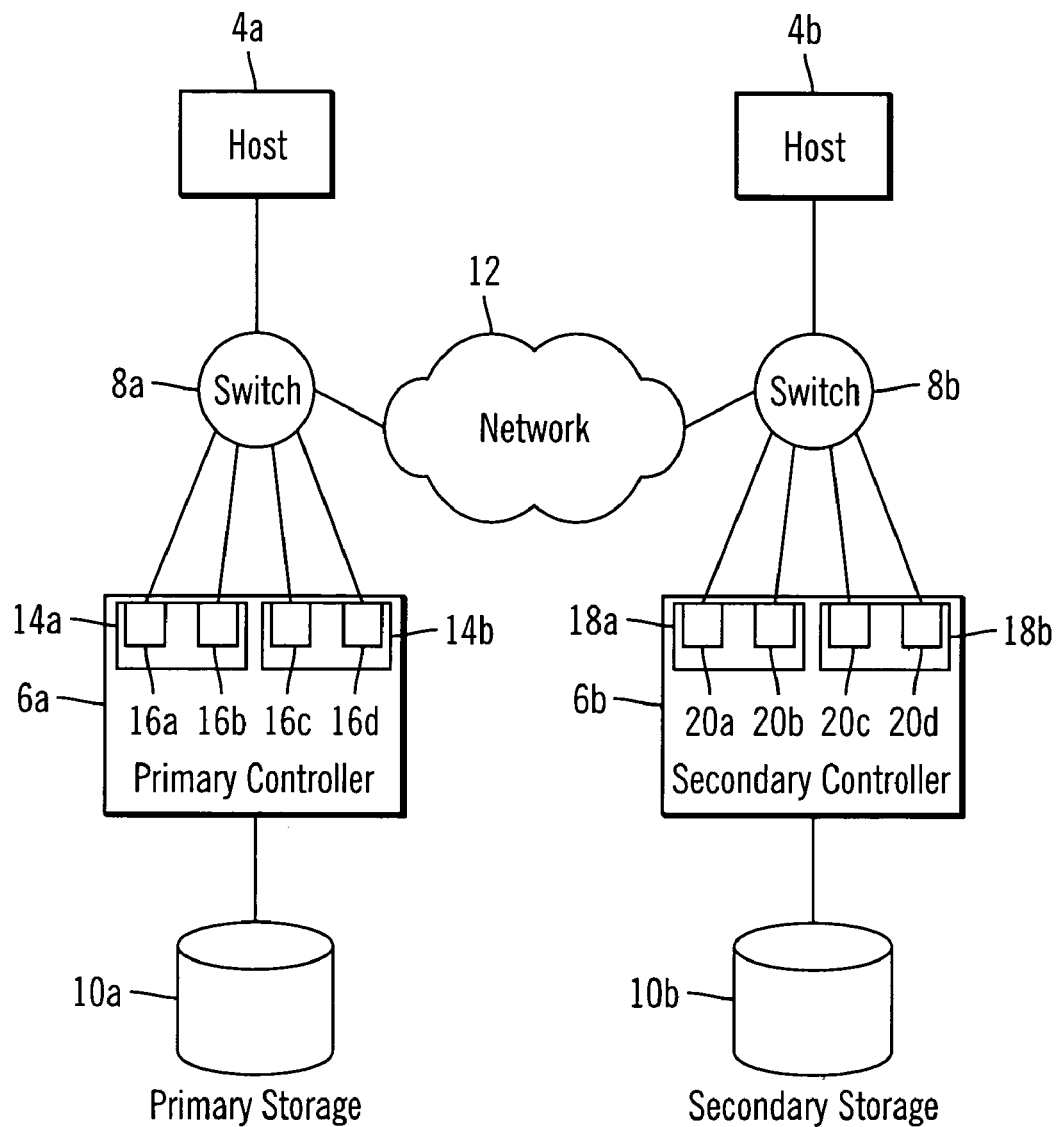
FIG. 1 is a block diagram illustrating a computing environment in which preferred embodiments are implemented.

FIG. 1 illustrates a computing environment in which preferred embodiments are implemented. Hosts 4a, b may comprise any computing device known in the art, including servers through which other client computers can access storage or clients. The hosts 4a, b each include at least one adaptor, such as a Fibre Channel or Small Computer System Interface (SCSI) adaptor card or any other network adaptor card known in the art. The host adaptors allow the hosts 4a, b to communicate with storage controllers 6a, b via switches 8a, b. The switches 8a, b may comprise the International Business Machines Corporation (IBM) Fibre Channel Storage Hub or Switch, the IBM SAN Fibre Channel Switch, or any other switching device known in the art. Each switch 8a, b has a port connecting to a network 12, which may comprise any local area network, wide area network, the Internet or any other network system. The network 12 may use routers and switches to dynamically determine the data path through the network 12.

In the described implementations, a primary controller 6a includes interface cards 14a and b having ports 16a, b, c, d and a secondary controller 6b includes interface cards 18a and b having ports 20a, b, c, d. Primary controller 6a would communicate with the secondary controller 6b via one of the ports 16a, b, c, d, switch 8a, the network 12, switch 8b, and then one of the ports 20a, b, c, d on the secondary controller 6b. Thus, the primary controller 6a can select one of sixteen paths to communicate with the secondary controller 6b, i.e., one of the ports 16a, b, c, d paired with one of the ports 20a, b, c, d. In alternative embodiments, each of the controllers 6a, b may include a different number of interface cards having a different number of ports to provide more or less communication paths therebetween.

In the preferred embodiments, the secondary storage 10b maintains a mirror copy of specified data volumes in the primary storage 10a. During an establishment phase, a relationship is established between primary volumes in the primary storage 10a and corresponding secondary volumes in the secondary storage 10b that mirror the primary volumes. After this relationship is established, the primary controller 6a will write any updates from hosts 4a, b to primary volumes to the secondary controller 6b to write to the secondary volumes in the secondary storage 10b.

The primary and secondary controllers 6a, b may include IBM Peer-to-Peer Remote Copy (PPRC), Extended Remote Copy (XRC) software, or other vender shadowing software to allow communication between the controllers 6a, b to coordinate data shadowing. In such embodiments, the controllers 6a, b may comprise large scale storage controllers, such as the IBM 3990 and Enterprise Storage System class controllers. In open system embodiments, the primary and secondary controllers 6a, b may comprise controllers from different vendors of different models, etc., and may not include any specialized protocol software for performing the backup operations. Further, the controllers may include any operating system known in the art, including the Microsoft Corporation Windows and NT operating systems. In open systems embodiments, the primary controller 6a can use commonly used write commands, such as SCSI write commands, to copy the primary volumes to the secondary volumes in the secondary storage 10b. In such open system embodiments, the secondary controller 6b does not need special purpose software to coordinate the shadowing activities with the primary controller 6b as the primary controller 6a accomplishes the shadowing by using standard write commands. Further, in such open systems, the primary and secondary controllers 6a, b may comprise any controller device known in the art and the primary and secondary controllers 6a, b may be of different models and model types, and even of different classes of storage controllers.

Enterprise Storage Server and ESCON are registered trademarks and Fibre Channel Raid Storage Controller is a trademark of IBM; Windows and Windows NT are registered trademarks of Microsoft Corporation.

Because there are multiple paths through which the primary controller 6a may communicate with the secondary controller 6b over a network 12, preferred embodiments provide an algorithm for the primary controller 6a to use when selecting a path from one of the ports 16a, b, c, d in the primary controller 6a to one of the ports 20a, b, c, d in the secondary controller 6b. The primary controller 6a may use this path selection algorithm when determining a path to use to communicate updates from a host 4a to primary volumes to be shadowed in secondary volumes in the secondary storage 10b.

Below are data structures, that are used by the path selection algorithm shown in FIGS. 3, 4, and 5:

Cumulative Transfer Time (cumulativeXferTime): An array data structure, as shown in FIG. 2a, has an entry for each of the sixteen paths and each of the block size ranges. Each of the sixteen rows corresponds to one port 16a, b, c, d paired with one port 20a, b, c, d. Each of the columns provides a block size range for the size of the update transferred down the path. Thus, the cumlativeXferTime array provides the total transfer time for all transfers in a measurement period down one of the sixteen paths within one of the three block size ranges, e.g., less than nine blocks, between nine and sixty-four blocks and more than sixty-four blocks.

Number Transfers (numXfers): An array data structure having an entry for one of the sixteen paths and one of the block size ranges, i.e., the same number of entries and column and row labels as the cumulative transfer time array. The number transfers array accumulates the number of transfers in a measurement period down one of the sixteen paths having one of the three block size ranges. If a path for a particular block size range is disabled, then the entry in the numXfers array for the path and block size range will maintain a counter indicating the number of transfers for which the path will remain disabled for that block size range. Once this counter is decremented to zero, the path for the block size range will be enabled and available for use.

Transfer Count (xferCount): A one column array, as shown in FIG. 2b, having one entry for each block size range. Each entry provides the number of transfers across all paths for a given block size during the measurement period. A measurement period ends for a given block size when the value in one of the entries in the xfercount array reaches a predetermined value, such as 128 or any other selected number.

Path Enabled (pathEnabled): An array data structure having an entry for one of the sixteen paths and one of the block size ranges, i.e., the same number of entries and column and row labels as the cumulative transfer time array. Each entry is a boolean value indicating whether the preferred path is enabled, i.e., whether the controller 6a can select this path to use for a write operation to the secondary controller 6b having an update within the block size range for the entry.

Figure 3:
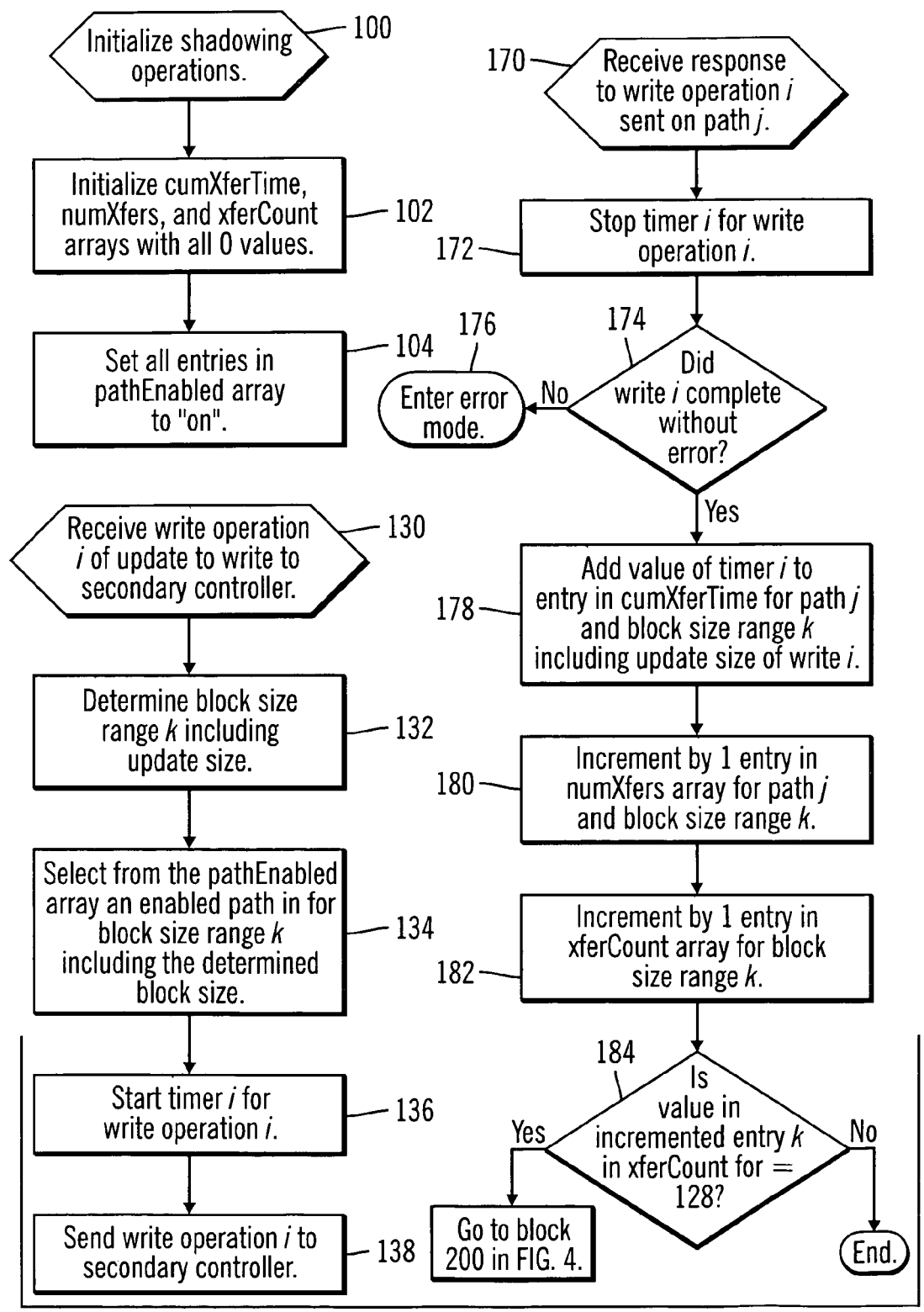
FIGS. 3, 4, and 5 illustrate logic implemented in a controller to select one of multiple paths to use to transfer data to a remote controller in accordance with the preferred embodiments of the present invention.
Figure 4:
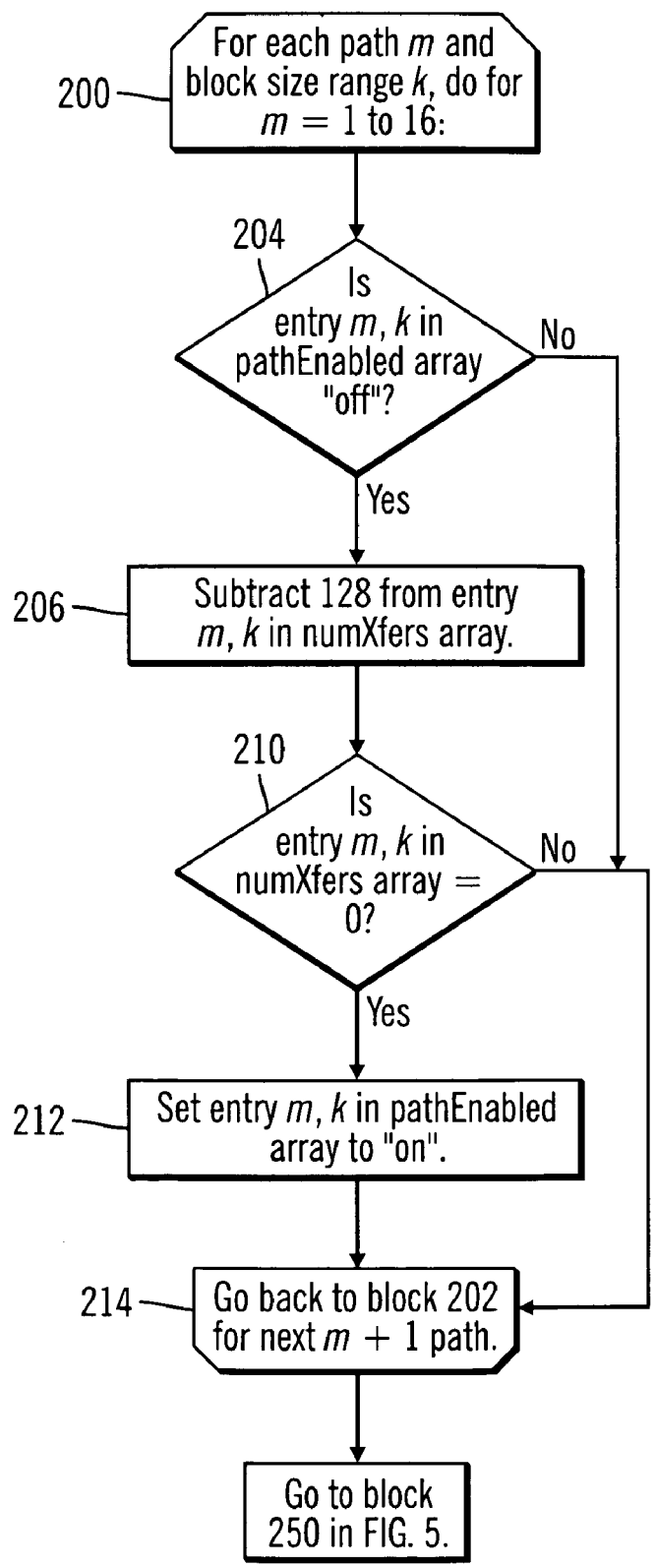
Figure 5:
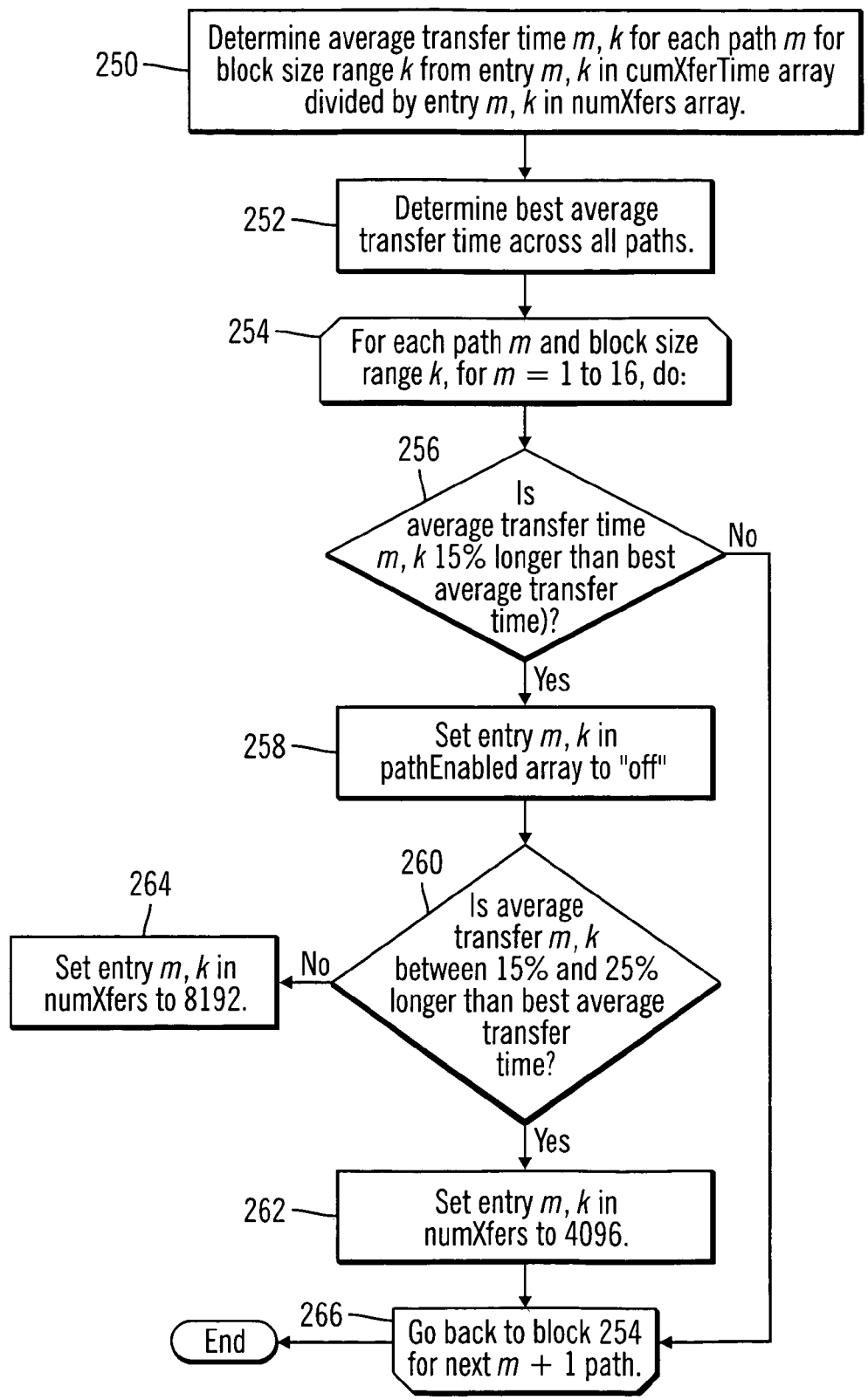

The preferred path algorithm shown in FIGS. 3, 4, and 5 uses the above data structures to gather performance information for each path and for updates within one of three different block size ranges. In preferred embodiments, data is gathered for a measurement period of n transfers, which in the described implementation is set to 128. After n transfers for one of the block sizes, the preferred path algorithm analyzes the data to determine whether to disable or enable the paths for that block size. If a given path is disabled for a block size, then the primary controller 6a would not select such disabled path for an update within the block size range and would only select one of the enabled paths for the block size range. The path selection algorithm may use any selection technique known in the art, e.g., round robin, etc., for selecting from one of the enabled paths to use to transfer an update within a block size range.

FIGS. 3, 4, and 5 illustrate path selection logic implemented as code and executed by the primary controller 6a. With respect to FIG. 3, control begins at block 100 with the primary controller 6a initiating shadowing operations to write any updates to primary volumes in the primary storage 10a to the secondary controller 6b after the establishment of a relationship between primary volumes in the primary storage 10a and secondary volumes in the secondary storage 10b. The primary controller 6a then initializes all the arrays (at blocks 102 and 104) by setting all the entries in the cumulative transfer time (cumXferTime) array, number transfers array (numXfers), and the transfer count array (xfercount) to zero. All entries in the path enabled array (pathenabled) are set to "on", indicating that initially all paths for all block size ranges are available for selection.

After initializing all the arrays, the primary controller 6a would wait (at block 130) for any write operation i comprising an update to a primary volume from hosts 4a, b. In response, the primary controller 6a would determine (at block 132) the block size range k (in the described implementation there are three possible ranges) including the size of the update in write i. In SCSI embodiments, the primary controller 6a can determine the size of the update from the transfer length field in the write command descriptor block (CDB). The primary controller 6a would then select (at block 134) from the path enabled array (pathEnabled) an enabled path, i.e., an entry for a path that has an "on" value, for the determined block size range k. The primary controller 6a may use any selection procedure known in the art for selecting one enabled path, round robin, etc. The primary controller 6a would then start (at block 136) timer i for write i and send (at block 138) the write i to the secondary controller 6b to apply to the secondary volume in secondary storage 10b. The update would also be applied to the primary volume in primary storage 10a.

At block 170, the primary controller 6a waits for a response to one of the outstanding write operations, or write i which was initially sent down path j. The primary controller 6a may maintain information associating a selected path j, a write i, and the timer i. When the response for a write is received, the primary controller 6a can then use this information to determine the write i for which the response is received, and also the timer i and path j for write i. Upon receiving a response from the secondary controller 6b that the write i completed, the primary controller 6a would stop (at block 172) timer i for the completed write i. If write i did not successfully complete (at block 174), then an error mode would occur (at block 176). Otherwise, if the write i was successful, then the primary controller 6a would (at block 178) add the time value in timer i to the entry in the cumulative transfer time array (cumXferTime) for path j and block size range k, or entry j, k, where the update of write i falls within block size range k. The entry j, k in the number of transfers array (numXfers), indicating the number of writes completed down path j within the block size range k, is incremented (at block 180) by one. Further the kth entry in the transfer count array (xfercount) is incremented (at block 182) by one, indicating the number of writes completed for that particular block size range k. If, at block 184, the value in the incremented entry k in the transfer count array (xfercount) is equal to 128, or any other measurement period integer value, then control proceeds to block 200 in FIG. 4; otherwise, the logic ends.

The preferred logic of FIG. 3 accumulates the time for write operations for each path by block size range so that any comparisons of time for the paths will primarily be based on network transmission factors. Because the time is accumulated for a same transfer size range, the size effect of the transfer on the performance of the secondary controller 6b in affecting the secondary controller 6b load will be relatively constant. Thus, the primary difference in the performance among paths within a same block size range will be network transmission delays associated with the paths as the load the write operation imposes on the secondary controller 6b remains relatively constant for the cumulative time measurements within a block size range.

The preferred logic of FIGS. 4 and 5 is implemented if one of the entries for a block size in the transfer count (xfercount) array equals the measurement period, which in the described implementation is 128. Thus, a path enablement decision is made for the paths in a particular block size range k after the data points collected for a range k reaches the measurement period. The measurement period should be selected sufficiently large to allow useful statistical information to be gathered for the paths in a particular block size range, yet not too large such that enablement adjustments would be unduly delayed. Lengthy delays in adjustments to the path enablement settings would allow the continued selection of poor performing paths that would otherwise be disabled during an adjustment.

If the measurement period, e.g., 128 write operations, has been reached for the block size range k entry in the transfer count array (xferCount), then the primary controller 6a, at blocks 200-214 in FIG. 4, will decrement the number transfers counter (numXfer) for each disabled path and block size range. As discussed, if a path is disabled for a block size range, then the numXfer entry for that path and block size maintains a counter that is decremented for each transfer. Once the entry is decremented to zero, the path is reenabled and made available for use. For each path m where m equals 1 to 16 (or any other alternative number of possible paths between the devices), the primary controller 6a will perform steps 204 to 212 within the loop to adjust the number transfer counter (numXfer) for disabled paths for the given block size range k. At block 204, the primary controller 6a determines whether entry m, k in the path enabled array (pathEnabled) is "off". If so, then the primary controller 6a subtracts (at block 206) 128 from the entry m, k in the number of transfers array (numXfers). In the described implementation, the primary controller 6a subtracts a number of completed transfers every 128 transfers for the block size range, thus saving processing cycles by not having to perform the logic of FIG. 4 after every write operation.

If (at block 210) the entry m, k in the number transfers array (numXfers) was just decremented to zero at block 206, then the primary controller 6a sets (at block 212) the entry m, k in the path enabled array (pathEnabled) to "on" making that path m for block size range k available for use. If the entry m, k is already enabled (no branch of block 204) or the counter is not decremented to zero (no branch of 210) or after the entry m, k is enabled (at block 212), then control transfers to block 214 where the primary controller 6a will proceed back to block 200 if there are further paths to consider. Otherwise, control proceeds to block 250 in FIG. 5.

At blocks 250-266 in FIG. 5, the primary controller 6a determines whether to disable any paths for the block size range k whose entry in the transfer count array (xfercount) reached the measurement period value, e.g., 128. At block 250, the primary controller determines an average transfer time m, k for each path m for the block size range k by dividing the entry m, k for path m and block size range k in the cumulative transfer time array (cumXferTime), indicating the total transfer time for all completed writes for path m and block size range k, by the number of transfers for that path m and block size range k that resulted in the total transfer time indicated in entry m, k in cumXferTime. From the calculated average transfer times calculated at block 250, the best average total transfer time for block size range k is then determined (at block 252). The primary controller 6a then performs a loop between blocks 254 and 266 to determine whether to disable each path m for the block size range k.

If (at block 256) the average transfer time m, k for path m is not 15% longer than the best average transfer time, then the path m for block size range k is not disabled and control proceeds (at block 266) to consider the next (m+1)th path in block size range k. Otherwise, if the transfer time of path m is 15% longer than the best average transfer time, then the path m for block size range k is disabled (at block 258) by setting the entry m, k in the path enabled array (pathEnabled) to "off". If the average transfer time m, k for path m is between 15% and 25% longer than the best average transfer time (at block 260), then the entry m, k for path m in the number of transfers array (numXfers) is set (at block 262) to 4096, indicating the number of transfers for block size range k before the path m for block size rang k is reset to enabled and available for use. Otherwise, if the average transfer time m, k for path m is more than 25% longer than the best average transfer time, then the entry m, k in numXfers is set (at block 264) to 8192. In preferred embodiments, the number of transfers for which a path is disabled is a multiple of the measurement period, to ensure that subtraction of the measurement period from the disablement counter will eventually produce zero.

With the logic of FIG. 5, the path remains disabled for a longer number of transfers if the performance for the path is 25% worse than the best average performance, i.e., the average transfer time for a path m and given block size range k takes more than 25% longer than the best average transfer time as opposed to if the average transfer time for path m is only 15% to 25% worse than the best average transfer time. In other words, the more degraded the performance for a path m and block size range k, the longer the path will be disabled and taken off-line.

The preferred embodiment algorithm for selecting paths optimizes overall performance when multiple paths are available between the two devices by removing those paths from selection whose performance is appreciably worse than that of other paths. Those paths removed from selection are not available for selection in the round robin path selection process to use for a transfer operation between the devices. Preferred embodiments gather performance data and periodically analyze the data to determine whether to adjust the enablement or disablement setting for each path for a given block size range. Certain of the performance problems associated with a path may only be temporary. For this reason, it is desirable to occasionally enable previously disabled paths so that transient conditions do not permanently remove a path from the selection process. In this way, temporary bottlenecks in the system are avoided and the best pair of source and destination ports 16a, b, c, d, and 20a, b, c, d (FIG. 1) are selected for communication between the primary 6a and secondary 6b controllers. In further embodiments, if there is no enabled path available for a particular transfer operation, then one of the disabled paths may be selected and used.

In open systems embodiments, the primary controller 6a is able to determine the path performance to the secondary controller 6b without having to establish a special communication protocol, which would require software on both the primary 6a and secondary 6b controllers, e.g., IBM PPRC and XRC software. Instead, in preferred embodiments, the primary controller 6a may write updates to the secondary controller 6b using standard SCSI commands, and can select an optimal path based on acknowledgment information the secondary controller 6b returns under the SCSI protocol. In this way, the secondary controller 6b does not have to know that it is being monitored as the primary controller 6a independently handles the monitoring. In alternative embodiments where the primary 6a and secondary 6b controllers include specialized shadowing software, there may be additional communications to perform path selection optimization.

CONCLUSION

The following describes some alternative embodiments for accomplishing the present invention.

The preferred embodiments may be implemented as a method, apparatus or program using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, programmable logic, memory devices (e.g., EEPROMs, ROMs, PROMs, RAMs, SRAMs, etc.) carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such signal-bearing media, when carrying computer-readable instructions that direct the functions of the present invention, represent alternative embodiments of the present invention.

In preferred embodiments, one primary controller 6a shadowed data on a single secondary controller 6b. However, in alternative arrangements, one primary controller may shadow data at multiple secondary controllers or multiple primary controllers may shadow data at one or more secondary controllers.

The preferred logic of FIGS. 3-5 describes specific operations occurring in a particular order. In alternative embodiments, certain of the logic operations may be performed in a different order, modified or removed and still implement preferred embodiments of the present invention. Moreover, steps may be added to the above described logic and still conform to the preferred embodiments. Further, operations described herein may occur sequentially or certain operations may be processed in parallel.

In preferred embodiments, the primary and secondary controllers communicated over a fibre channel interface using SCSI commands. In alternative embodiments, different command protocols may be utilized. For instance, the ESCON protocol may be used for the channel communications and the count-key-data (CKD) protocol may be used for the input/output (I/O) commands.

Preferred embodiments were described with respect to a storage system in which data from a primary site is shadowed at a secondary site as part of a data backup and recovery system. However, the preferred method, system, and program for selecting an optimal path between a primary 6a and secondary 6b controller for data shadowing operations may apply to any two devices having multiple paths therebetween. For instance, the preferred embodiment path selection algorithm may apply to any situation where one system is selecting from one of multiple paths to another system and, in particular, to paths that are directed through a network that may provide additional routing and switching of the paths.

In preferred embodiments a write operation including an update was transmitted down the selected path. In alternative embodiments, any type of data may be communicated via the selected path.

Further, in preferred embodiments the paths traversed a network. In alternative embodiments the paths may comprise point-to-point paths communication lines between the two devices.

In preferred embodiments, specific values were specified for the measurement period (128) and number of writes to keep a path disabled (4096 or 8192). In alternative embodiments different values may be used. Further, there may be additional thresholds for providing additional transfers a path may remain disabled based on additional performance criteria.

In summary, preferred embodiments disclose a method, system, and program for selecting one of multiple data paths to a device. A selection is made of one of multiple paths indicated as enabled to transmit data. A path is indicated as enabled or disabled. Transfer time data is gathered for each enabled path capable of being selected. Paths having transfer time data satisfying a threshold are indicated as disabled. Paths indicated as disabled are not capable of being selected to use to transmit data.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for selecting one of multiple data paths to a device, comprising:
    selecting one of multiple paths indicated as enabled to transmit data, wherein a path is indicated as enabled or disabled;
    gathering transfer time data for first and second transfer sizes for each path, wherein the transfer size is a size of the data being transferred in one transfer operation;
    determining one path currently indicated as enabled to be selected to transfer data for the first transfer size that has transfer time data for the first transfer size satisfying a threshold transfer time; and
    indicating the determined path as disabled for the first transfer size, wherein paths indicated as disabled for one of the transfer sizes are not capable of being selected to use to transmit data having the transfer size, wherein the determined path indicated as disabled for the first transfer size is enabled to transfer data for the second transfer size.

2. The method of claim 1, further comprising:
    indicating one disabled path as enabled after performing a threshold number of transfer operations.

3. The method of claim 2, wherein the path indicated as disabled is disabled for a first threshold number of transfer operations if the transfer data time for the path satisfies a first threshold and is disabled for a second threshold number of transfer operations if the transfer data time for the path satisfies a second threshold.

4. A method for selecting one of multiple data paths to a device, comprising:
    selecting one of multiple paths indicated as enabled to transmit data for a plurality of transfer size ranges, wherein a path is indicated as enabled or disabled;
    for each enabled path, gathering a cumulative transfer time for all transfer operations for each of the transfer size ranges during a measurement period through the path and a cumulative number of the transfer operations for each of the transfer size ranges during the measurement period; and
    for each enabled path determining the average cumulative transfer time for each of the transfer size ranges for the measurement period by dividing the cumulative time for the transfer size range by the cumulative number of transfers for the transfer size range; and
    indicating one of the paths as disabled for one of the transfer size ranges if the average cumulative transfer time for the path for the transfer size range satisfies a threshold, wherein the paths are capable of being selectively enabled and disabled for different transfer size ranges.

5. The method of claim 4, wherein the measurement period comprises a number of transfer operations for all paths, wherein the determination to disable paths occurs after the number of transfer operations in the measurement period has occurred, and further comprising starting another measurement period to gather transfer time data for the transfer size ranges after determining paths to disable.

6. The method of claim 4, wherein the determination to disable paths for one of the transfer size ranges occurs after the number of transfer operations in the measurement period has occurred, and further comprising starting another measurement period to gather transfer time data for the transfer size ranges after determining paths to disable for the transfer size ranges.

7. The method of claim 4, wherein the transfer time is measured for the transfer size ranges from the time the transfer is sent to the device to the time a response is received from the device indicating that the transfer completed, further comprising adding the transfer time for a transfer transmitted down the path to the cumulative transfer time for the transfer size range for the path.

8. The method of claim 4, further comprising:
    for each enabled path, determining a best average transfer time for each of the transfer size ranges from the average cumulative transfer times for each of the transfer size ranges for all paths, wherein determining whether the average cumulative transfer time for one path and transfer size range satisfies the threshold comprises determining whether the average cumulative transfer time for the transfer size range and the path exceeds the best average transfer time for the transfer size range by a percentage amount.

9. The method of claim 8, wherein determining whether the average cumulative transfer time for each of the transfer size ranges satisfies the threshold further comprises disabling the path for one of the transfer size ranges for a first number of transfer operations if the average cumulative transfer time for the transfer size range for the path exceeds the best average transfer time for the transfer size range by a first percentage amount and disabling the path for the transfer size range for a second number of transfer operations in response to determining that the average cumulative transfer time for the transfer size range for the path exceeds the best average transfer time by a second percentage amount.

10. The method of claim 1, wherein the multiple paths comprise multiple paths between a first controller and a second controller, and wherein one path is selected to transmit updates to a primary storage area managed by the first controller to the second controller to store in a secondary storage area.

11. The method of claim 1 wherein the paths extend through a network.

12. The method of claim 1, wherein the threshold is satisfied if a percentage of a first average transfer time for the given path exceeds second average transfer time.

13. The method of claim 1, wherein the threshold transfer time comprises a first threshold transfer time and wherein the determined path disabled for the first transfer size is enabled for the second transfer size in response to transfer time data for the second transfer size for the determined path not satisfying a second threshold transfer time.

* * * * *